(12) United States Patent
Varga et al.

(10) Patent No.: US 7,529,839 B2
(45) Date of Patent: May 5, 2009

(54) REQUEST REDIRECTION HANDLING IN IMC

(75) Inventors: Jószef Varga, Nagydobsza (HU); Gábor Bajkó, Budapest (HU); Gábor Járó, Budapest (HU); Zsolt Rajkó, Lovasberény (HU); Georg Mayer, Espoo (FI)

(73) Assignee: Nokia Corporation, Espoo (FI)

( * ) Notice: Subject to any disclaimer, the term of this patent is extended or adjusted under 35 U.S.C. 154(b) by 865 days.

(21) Appl. No.: 10/633,692

(22) Filed: Aug. 5, 2003

(65) Prior Publication Data
US 2004/0193727 A1 Sep. 30, 2004

(30) Foreign Application Priority Data
Mar. 24, 2003 (EP) .................... 03006573

(51) Int. Cl.
G06F 15/16 (2006.01)
(52) U.S. Cl. .................... 709/227; 370/395.2
(58) Field of Classification Search ........... 709/27–228, 709/229; 705/1; 726/4; 370/261, 395.2
See application file for complete search history.

(56) References Cited

U.S. PATENT DOCUMENTS

| | | | | |
|---|---|---|---|---|
| 6,327,258 | B1 * | 12/2001 | Deschaine et al. | 370/356 |
| 6,683,871 | B1 * | 1/2004 | Lee et al. | 370/356 |
| 6,947,724 | B2 * | 9/2005 | Chaney | 455/408 |
| 7,007,087 | B1 * | 2/2006 | Souma et al. | 709/225 |
| 7,349,402 | B2 * | 3/2008 | Isomaki et al. | 370/395.2 |
| 2003/0108002 | A1 * | 6/2003 | Chaney et al. | 370/261 |
| 2003/0129962 | A1 | 7/2003 | Chaney | |
| 2003/0131151 | A1 * | 7/2003 | Roach et al. | 709/328 |
| 2003/0145098 | A1 * | 7/2003 | Litwin | 709/232 |
| 2007/0038765 | A1 * | 2/2007 | Dunn | 709/229 |

FOREIGN PATENT DOCUMENTS

| | | |
|---|---|---|
| EP | 0 924 942 A2 | 6/1999 |
| EP | 0 996 260 A2 | 4/2000 |
| JP | 09-312882 | 12/1997 |
| JP | 2000-132524 | 5/2000 |
| JP | 2002-535888 | 10/2002 |
| WO | WO 97/22209 | 6/1997 |
| WO | WO 00/42760 | 7/2000 |
| WO | WO 00/54485 | 9/2000 |

(Continued)

OTHER PUBLICATIONS

Jennings, C. et al.; "Private Extensions to the Session Initiation Protocol (SIP) for Asserted Identity within Trusted Networks", RFC 3325 (RFC3325), Nov. 2002, pp. 1-14.

(Continued)

*Primary Examiner*—Salad Abdullahi
(74) *Attorney, Agent, or Firm*—Squire, Sanders & Dempsey L.L.P.

(57) ABSTRACT

An apparatus and method of processing a service request in an IP multimedia core network is provided. The method includes the steps of receiving a service request initiated by a first user, for a second user, forwarding the received service request to a unit for processing the service, receiving a processing result from the processing unit, and determining, on the basis of the received processing result, whether the service request processing for the second user is to be stopped.

37 Claims, 5 Drawing Sheets

FOREIGN PATENT DOCUMENTS

| WO | WO 02/39757 A1 | 5/2002 |
| WO | WO 02/078362 A1 | 10/2002 |
| WO | WO 02/091780 A1 | 11/2002 |

OTHER PUBLICATIONS

Rosenberg, J. et al.; "*SIP: Session Initiation Protocol*", RFC 3261 (rfc3261)—SIP: Session Initiation Protocol, Jun. 2002, pp. 1-209.

3GPP TS 24.229 v5.3.0, *3rd Generation Partnership Project; Technical Specification Group Core Network; IP Multimedia Call Control Protocol Based on SIP and SDP; Stage 3 (Release 5)*, Dec. 2002, pp. 1-230.

3GPP TS 23.218 v5.3.0, *3rd Generation Partnership Project; Technical Specification Group Core Network; IP Multimedia (IM) session Handling; IP Multimedia (IM) Call Model; Stage 2 (Release 5)*, Dec. 2002, pp. 1-55.

"An Extension to the Session Initiation Protocol for Request History Information," M. Barnes et al., Internet Draft—Work in Progress, https://xesife001.nokia.com, Aug. 2003.

"SIP: Session Initiation Protocol," J. Rosenberg, et al., Network Working Group, https://xesife001.nokia.com, Jun. 2002.

Notification of Reason for Rejection (English Translation), Patent Appln. No. JP 2005-518545, Dispatched on Feb. 25, 2008, pp. 3-5.

Partial English translation of Japanese Office Action dated Jul. 15, 2008.

* cited by examiner

REQUEST REDIRECTION HANDLING IN IMC

BACKGROUND OF THE INVENTION

1. Field of the Invention

The present invention relates to service request handling in IMC (IP Multimedia Core). In particular, the invention relates to redirecting a service request for a served user in IMC.

2. Description of the Related Art

There are many applications of the Internet that require the creation and management of a session, where a session is considered an exchange of data between an association of participants. The implementation of these applications is complicated by the practices of participants: users may move between endpoints, they may be addressable by multiple names, and they may communicate in several different media—sometimes simultaneously. Numerous protocols have been authored that carry various forms of real-time multimedia session data such as voice, video, or text messages. The Session Initiation Protocol (SIP) works in concert with these protocols by enabling Internet endpoints (called user agents) to discover one another and to agree on a characterization of a session they would like to share. For locating prospective session participants, and for other functions, SIP enables the creation of an infrastructure of network hosts (called proxy servers) to which user agents can send registrations, invitations to sessions, and other requests. SIP is an agile, general-purpose tool for creating, modifying, and terminating sessions that works independently of underlying transport protocols and without dependency on the type of session that is being established.

More details about SIP as defined by the Internet Engineering Task Force are described in Request For Comments 3261. As mentioned above, SIP allows the establishment, handling and release of end-to-end multimedia sessions. There are several additions to the SIP protocol, which e.g. allow event notification based on SIP, which is the basis for a SIP based Presence Service and other services.

The 3GPP IMS (Third Generation Partnership Project IP Multimedia Subsystem) utilizes SIP in order to achieve a wide range of functionality within the 3GPP (wireless) network.

S-CSCFs (Serving Call State Control Functions) in the IMS download filter criterions (FCs) from a HSS (Home Subscriber System). FCs are evaluated one-by-one, i.e. an incoming request is checked by a terminating S-CSCF based on the public user identity in the Request-URI (Universal Resource Identifier) as to whether the first or initial FC (highest priority) matches. If it matches, the S-CSCF sends it to the related Application Server (AS) that is indicated by the FC and adds a "dialog identifier" in the route header that is pointing back to the S-CSCF.

When the request is sent back from the AS and received again at the S-CSCF, the S-CSCF identifies the request by the dialog identifier and checks for matching of the next following FCs of lower priority, and applies the filter criteria on the SIP method as received from the previously contacted AS. Depending on the result of the previous process, the S-CSCF may contact one or more application server(s).

Due to some special services the AS may redirect the request (e.g. Call Forwarding). In these cases, it might be undesirable for the AS that the S-CSCF performs the subsequent FCs. According to the prior art, such behavior of the S-CSCF cannot be affected by the AS.

Call forwarding as an example of service request redirection is one of the most generally used services in telecommunication systems. Its utilization significantly impacts session handling in IP Multimedia Core Subsystem, thus it should be accurately defined.

The latest version of 3GPP TS 24.229 Release 5 standard (v. 5.3.0) specifies terminating procedures at S-CSCF generally without considering the special effects of executed services. Request redirection modifies the Request-URI data of the affected session, which requires special processing in S-CSCF which cannot be accomplished with the general description of the standard. According to the prior art as described in chapter 5.4.3.3 "Request terminated at the served user" of 3GPP TS 24.229, v. 5.3.0, in a situation of request redirection such as call forwarding, the execution of the rest of procedures will conflict with the purpose of call forwarding.

According to the general description in point 11 of chapter 5.4.3.3 "Request terminated at the served user" of 3GPP TS 24.229, v. 5.3.0, the Request-URI is overwritten, eliminating the possibility of call forwarding itself. In other words, according to the prior art, a Request-URI is built by the S-CSCF with the contents of a saved Contact URL (Universal Resource Locator) where the user served by the S-CSCF is reachable, which Contact URL is determined from the destination public user identity.

A specific description of call forwarding is not given so far in IP Multimedia Subsystem (IMS), and call forwarding handling in IMS is completely different from that in other existing systems.

SUMMARY OF THE INVENTION

The invention seeks to enable request redirection such as call forwarding in IMC.

According to one embodiment of the invention, a method of processing a service request in an IP multimedia core network includes the steps of receiving a service request initiated by a first user, for a second user, forwarding the received service request to a unit for processing the service, receiving a processing result from the processing unit, and first determining, based on the received processing result, whether a service request processing for the second user is to be stopped.

According to another embodiment of the invention, a method of processing a service in an IP multimedia core network includes the steps of receiving a service request initiated by a first user for a second user, from a device serving the second user, processing the service, and returning a processing result to the device, based on the processing result the device being configured to determine whether a service request processing for the second user is to be stopped.

According to another embodiment of the invention, a method of handling a service request in an IP multimedia core network includes the steps of receiving a service request initiated by a first user, for a second user, in a device serving the second user, forwarding the received service request to a unit for processing the service, receiving the forwarded service request in the processing unit, processing the service in the processing unit, returning a processing result to the device, based on the processing result the device being configured whether a service request processing for the second user is to be stopped, receiving the processing result by the device from the processing unit, and determining, based on the received processing result, whether the service request processing for the second user is to be stopped.

According to another embodiment of the invention, a device for processing a service request in an IP multimedia core network includes means for receiving a service request initiated by a first user, for a second user, means for forwarding the received service request to a unit for processing the service, means for receiving a processing result from the processing unit, and means for determining, based on the received processing result, whether the service request processing for the second user is to be stopped.

According to another embodiment of the invention, a unit for processing a service in an IP multimedia core network includes means for receiving a service request initiated by a first user, for a second user, from a device serving the second user, means for processing the service, and means for returning a processing result to the device, based on the processing result the device being configured to determine whether a service request processing for the second user is to be stopped.

According to the invention, the tasks to be executed by a terminating S-CSCF in case of call forwarding are defined. In case of call forwarding, the terminating S-CSCF does not evaluate further filters but handles the call forwarding. Moreover, tasks which may be executed by an application server in case of call forwarding are defined.

BRIEF DESCRIPTION OF THE DRAWINGS

For a better understanding of the present invention and as to how the same may be carried into effect, reference will be made by way of example only to the accompanying drawings in which.

DETAILED DESCRIPTION OF THE PREFERRED EMBODIMENTS

Figure 1:
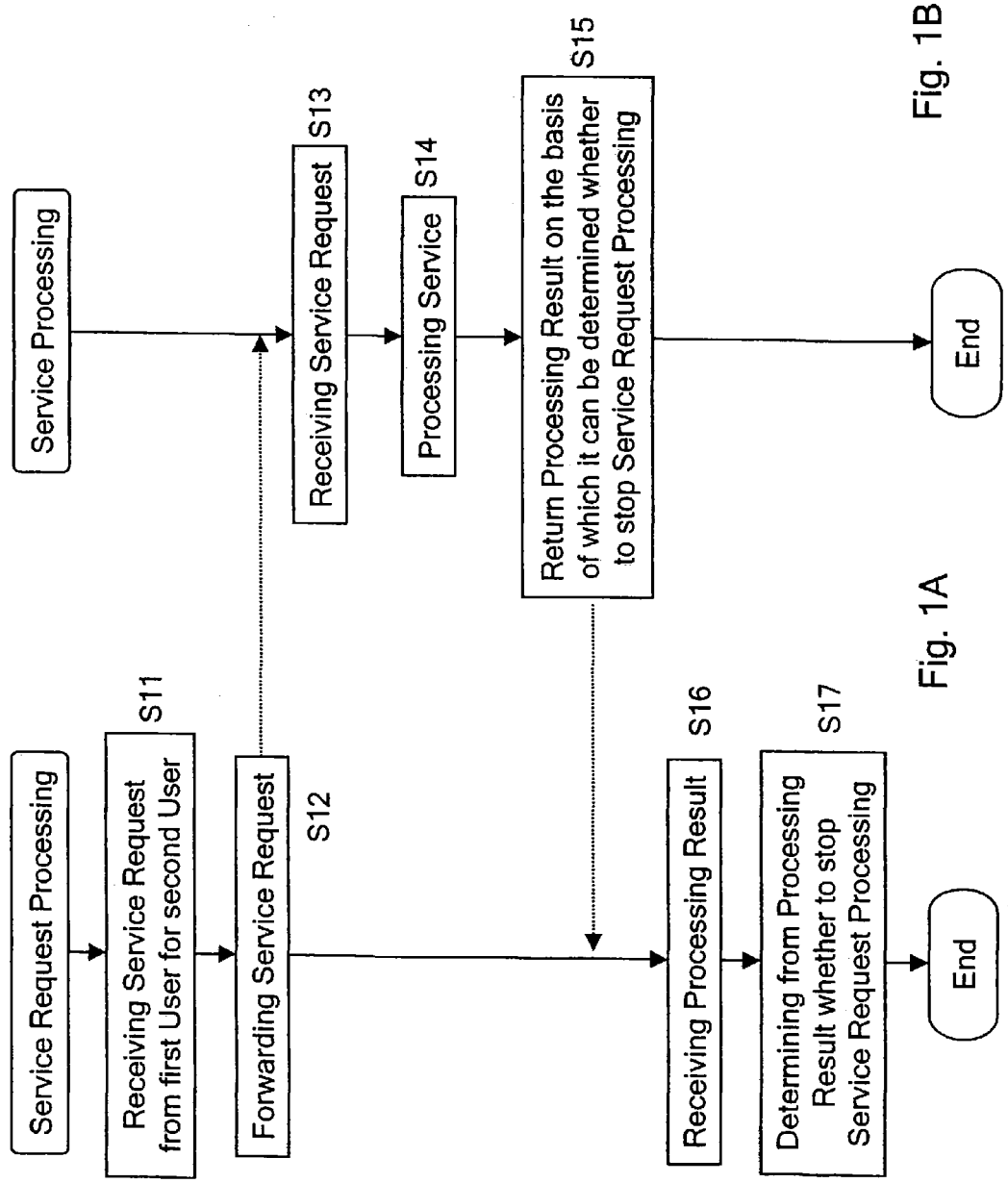
FIG. 1A shows a flow diagram illustrating a method of service request processing according to the invention.
FIG. 1B shows a flow diagram illustrating a method of service processing according to the invention.

FIG. 1A illustrates a method of processing a service request in an IP multimedia core network. In step S11, a service request for a user is received by a device serving the user. For example, this service request has been initiated by a first user towards a second user. After having received the service request, in step S12 it is forwarded to a unit for processing the service. Then, in step S16, a processing result is received from the processing unit, and on the basis of the received processing result in step S17 it is determined whether service request processing for the second user is to be stopped.

FIG. 1B shows a method of processing the service according to the service request forwarded to the processing unit. In step S13 a service request initiated by the first user towards the second user is received from the device serving the second user. In step S14 the service is processed, and in step S15, a processing result is returned to the device, on the basis of which it can be determined in the device (in step S17 in FIG. 1A) whether service request processing for the second user is to be stopped.

Figure 2:
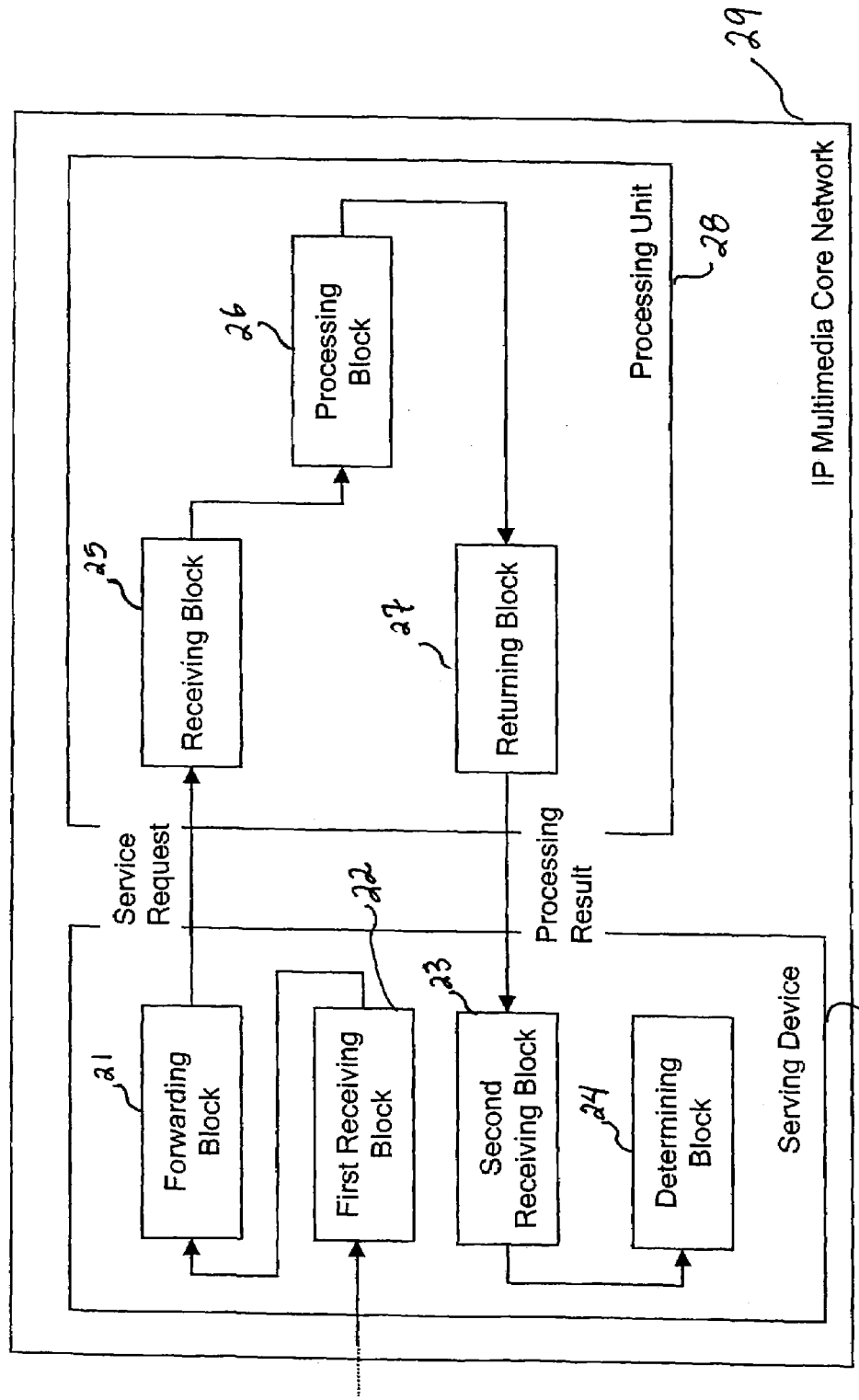
FIG. 2 shows a schematic block diagram illustrating a serving device and a processing unit in an IP multimedia core network according to the invention.

FIG. 2 shows an IP multimedia core network (IMC network) 29 arranged to perform steps S11 to S17 shown in FIGS. 1A and 1B. In particular, the IMC network 29 includes a device 20 serving a user for processing a service request for the served user and a processing unit 28 for processing a service corresponding to the service request.

The serving device 20 includes a first receiving block 22 for receiving a service request for the served user, a forwarding block 21 for forwarding the received service request to the processing unit 28 for processing the service, a second receiving block 23 for receiving a processing result from the processing unit 28, and a determining block 24 for determining, on the basis of the received processing result, whether service request processing for the served user is to be stopped.

The processing unit 28 includes a receiving block 25 for receiving the service request from the serving device 20, a processing block 26 for processing the service, and a returning block 27 for returning a processing result to the serving device 20, on the basis of which it can be determined in the device 20 whether service request processing for the second user is to be stopped.

According to an embodiment of the invention, the processing unit 28 may include in the processing result an indication for stopping service request processing for the served (second) user. Accordingly, the serving device 20 is arranged to check whether the processing result received from the processing unit 28 includes the indication for stopping service request processing for the second user, and in case the indication is present, to stop service request processing for the second user. The serving device 20 may also be arranged to check whether the indication is valid.

Moreover, before stopping service request processing for the second user, the serving device 20 may perform charging processing.

According to another embodiment of the invention, the received service request initiated by the first user may include a destination identifier of the second user, and upon service processing, the processing unit 28 may determine that the service request is to be forwarded to a third user, replace the destination identifier of the second user by a destination identifier of the third user, and return the processing result with the destination identifier of the third user to the serving device 20. The serving device 20 may compare the destination identifiers of the service request forwarded to the processing unit 28 and the processing result received from the processing unit 28, and in case it is detected that the compared identifiers are different from each other, service request processing for the second user is stopped. In addition the serving device 20 may determine, on the basis of the received processing result, whether the service request is to be forwarded to a third user, and may forward the service request to the third user on the basis of the destination identifier included in the processing result.

The service request of the first user received by the serving device 20 for the second user may include an originating identifier of the first user, and the processing unit 28 may include an originating identifier of the second user in the processing result when it determines during processing the service that the service request is to be redirected from the second user to a third user. Then, in the forwarding procedure, the serving device 20 may detect that the originating identifier included in the processing result is the originating identifier of the second user, and may forward the service request on the basis of the originating identifier included in the processing result. However, in case the originating identifier included in the processing result is not the originating identifier of the second user, the serving device 20 may include the originating identifier of the second user in the service request to be forwarded. Alternatively, in the forwarding procedure, the serving device 20 may always use the originating identifier included in the processing result.

According to an embodiment of the invention, the originating identifier of the first user is replaced by the originating identifier of the second user. Alternatively, the originating identifier of the second user is added to the originating identifier of the first user.

In the following, an embodiment of the invention will be described with reference to FIGS. 3 to 5.

Figure 3:
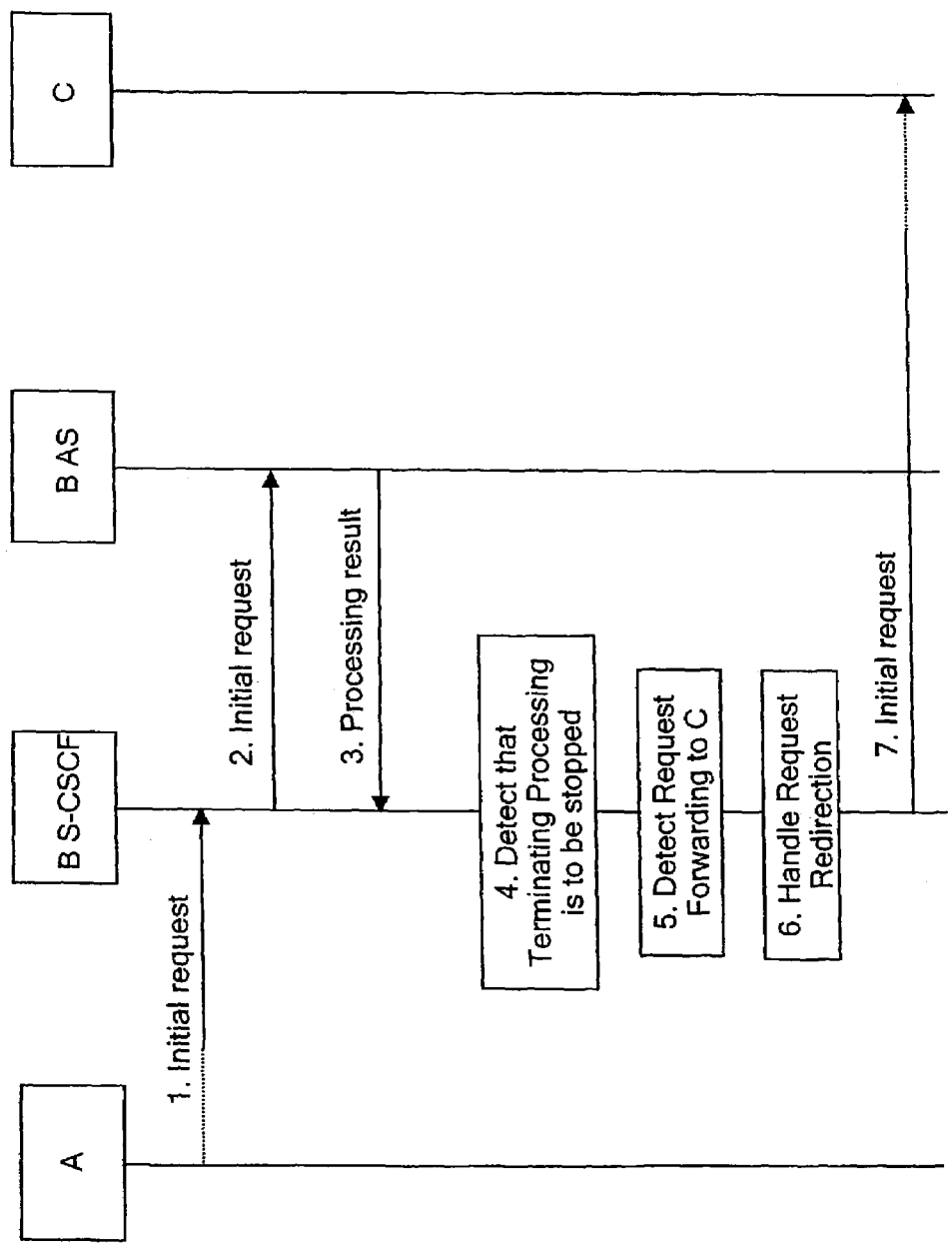
FIG. 3 shows a signaling diagram illustrating service request handling according to an embodiment of the invention.

FIG. 3 shows a signaling diagram in which a user A (first user) sends an initial service request towards a user B (second user). The service request is received by a device in the IMC serving user B (serving device), e.g. an S-CSCF (Serving Call State Control Function). The S-CSCF forwards the initial service request to a corresponding application server AS (processing unit) for the user B at which the service request is processed. After that, the AS returns a processing result to the S-CSCF. In so far, the process corresponds to 3GPP TS 24.229 version 5.3.0 release 5, chapter 5.4.3.3 "Requests terminated at the served user".

According to the invention, in processing the terminating services of a served subscriber or user in S-CSCF, after each service execution a check should be performed to determine whether the service included a process because of which the S-CSCF should not perform the subsequent filter criteria. For example, in case of service redirection such as call forwarding further terminating services of the called party should not be executed, i.e., the check for matching of the next following filter criteria of lower priority should be stopped.

As shown in FIG. 3, the S-CSCF of the user B detects from the processing result received from the AS that the terminating processing for the user B is to be stopped. Before stopping the terminating processing, the S-CSCF may perform charging related functions as described in points 5 to 7 of chapter 6.4.3.3 "Request terminated at the served user" of 3GPP TS 24.229 v. 5.3.0 release 5.

Further to the detection that the terminating processing is to be stopped, according to the invention it may be detected by the S-CSCF that the service request has to be forwarded to another user C. After such detection, the S-CSCF may handle this request redirection by performing charging related tasks as mentioned above and switching to originating mode, and finally forwarding the initial service request towards the user C as shown in FIG. 3.

Figure 4:
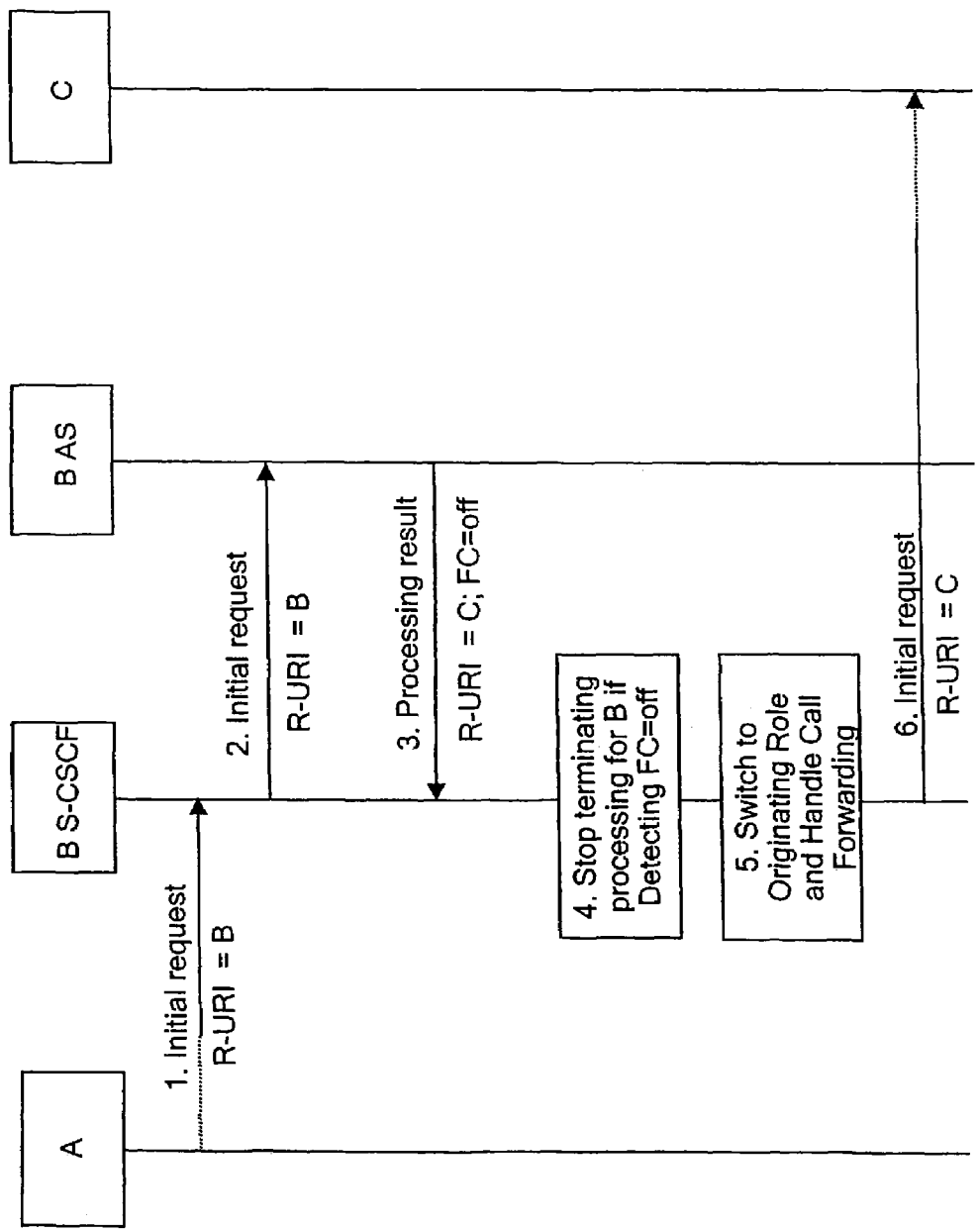
FIG. 4 shows a signaling diagram illustrating an example of call forwarding handling in S-CSCF according to an embodiment of the invention.

FIG. 4 shows an example of the embodiment of FIG. 3. According to FIG. 4, the initial request sent towards the B S-CSCF includes an R-URI (Request-Universal Resource Identifier) (destination identifier) of user B. The B S-CSCF forwards the request to the AS of user B. In processing the service, the B AS may detect a redirection of the service request to user C, for example. Since in this case the B S-CSCF should not perform subsequent filter criteria, the B AS may set an indication that the B S-CSCF should not evaluate further filter criteria.

The AS may set this indication as part of e.g. the Request-URI of the request that is sent back to the S-CSCF. This may be a tag in the Request-URI, e.g.:

sip:Georg.Mayer@miesbach.de;FC=off wherein "sip:Georg.Mayer@miesbach.de" is the R-URI of user C.

This indication may also be set in another way (e.g. extra header, parameter of another header, etc.)

The S-CSCF should then check if the indication is allowed to be set by the AS from which it received the request back. If it is allowed to set it, the S-CSCF should then stop evaluating the subsequent FCs and handle the request redirection immediately (or at least immediately after having performed charging operations as mentioned above). In other words, when the B S-CSCF detects the tag "FC=off" in the processing result returned from the B AS, it stops the terminating processing for the user B and switches to the originating role e.g. for handling a call forwarding towards the Request-URI indicated in the returned processing result.

Figure 5:
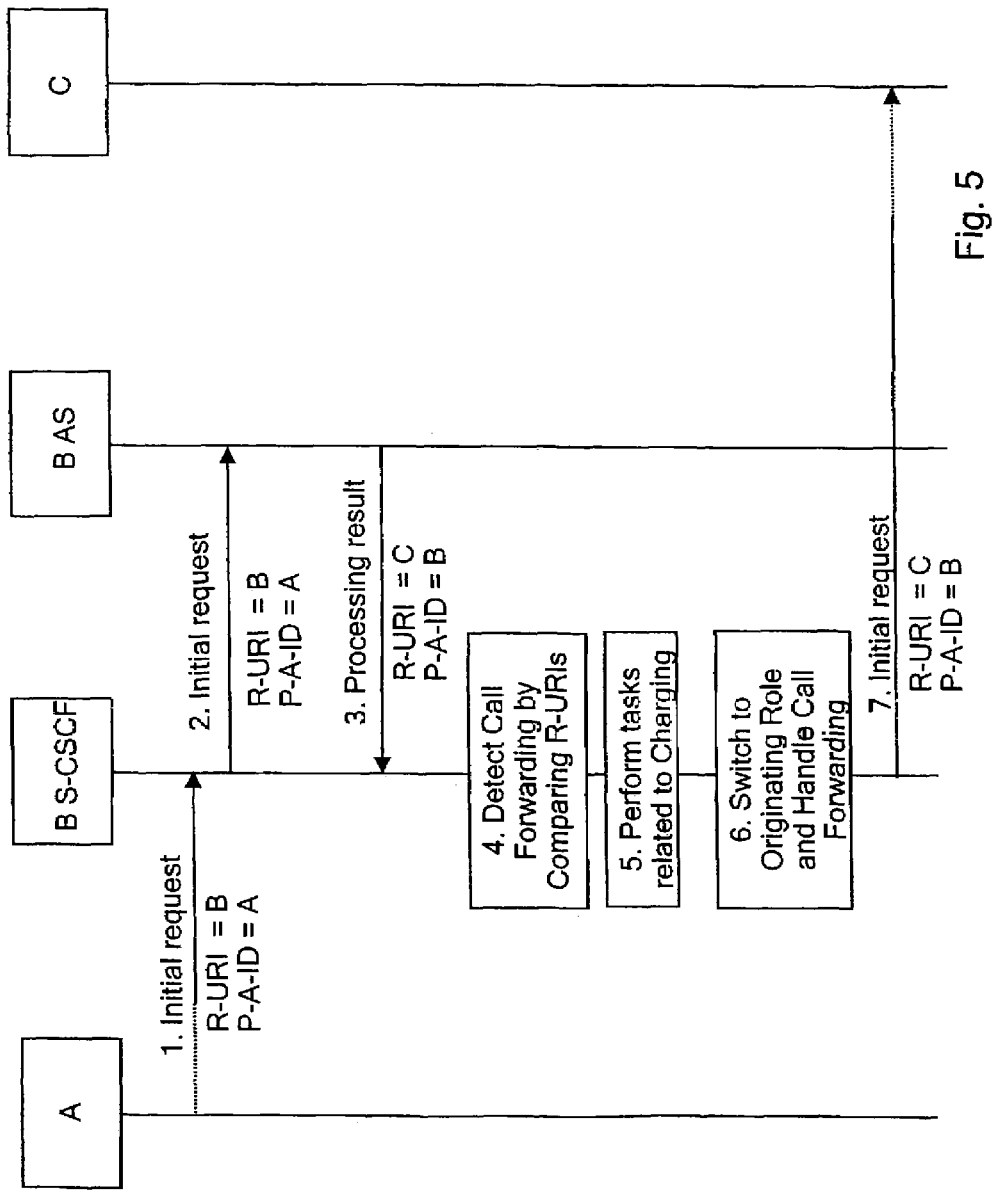
FIG. 5 shows a signaling diagram illustrating another example of call forwarding handling in S-CSCF according to an embodiment of the invention.

FIG. 5 shows a further example of the embodiment of FIG. 3. According to FIG. 5, the initial request sent towards the B S-CSCF includes an R-URI (Request-Universal Resource Identifier) (destination identifier) of user B and a P-A-ID (P-Asserted Identity) header (originating identifier) of user A.

The B S-CSCF forwards the request to the AS of user B. The result of processing the service may be a redirection of the service request to user C. In order to detect request redirection, the Request-URI sent to the AS and the Request-URI received from the AS are always compared by the S-CSCF. As shown in FIG. 5, the R-URI has changed from B to C, so that the S-CSCF detects that the executed request included a request redirection, such as call forwarding.

In call forwarding case the P-Asserted ID header should be modified so that the user C is enabled to notice that the request or call from user A is coming through user B. For example, if user C has a call barring for user A and user A calls user B who has call forwarding to user C, then from user B's point of view the forwarding will fail. According to the invention, the modification of the P-Asserted ID header may be done either by the AS implementing the call forwarding service or the terminating S-CSCF that detects call forwarding (in case the AS did not modify the header). According to FIG. 5, the B AS has already modified the P-A-ID from A to B. The modification is either the replacement of the P-Asserted ID header with the served user's IMPU (IP Multimedia Public User Identity) (it can be another IMPU of the served user as well) as shown in FIG. 5, or the insertion of the served user's IMPU (again, it can be another IMPU of the served user as well) at the beginning of the original P-Asserted ID header, i.e. 'P-A-ID=B,A'. As shown in FIG. 5, the call is then forwarded with P-A-ID=B.

After the detection of call forwarding in the B S-CSCF, the B S-CSCF may carry out the tasks related to charging as it is described in points 5, 6, and 7 of chapter 5.4.3.3 "Request terminated at the served user" of 3GPP TS 24.229 v. 5.3.0 release 5. If user B has set call forwarding, then user B should pay for the forwarded part of the call from B to C.

Upon completing charging related functionality the terminating S-CSCF changes the role from terminating S-CSCF to originating S-CSCF, and starts to operate as it is described in chapter 5.4.3.2 "Request initiated by the served user" of 3GPP TS 24.229 v. 5.3.0 release 5, wherein the served user in this originating S-CSCF is the forwarding IMPU stored in P-Asserted ID header, i.e. user B. In other words, the B S-CSCF switches to originating role and forwards the initial service request towards user C in accordance with 3GPP TS 24.229 version 5.3.0 release 5, chapter 5.4.3.2 "Request initiated by the served user".

The B S-CSCF should ensure that all the restrictions/settings defined for the calls originated by B are fulfilled. Therefore, according to the present invention, the originating services of the user B are executed. Not executing originating services in case of call forwarding, for example, would enable subscribers to call barred numbers by setting call forwarding to such numbers and calling themselves.

It is to be noted that the charging tasks shown as block 5 in FIG. 5 may also be performed in the embodiment shown in FIG. 4 after the detection that the terminating processing for B is to be stopped and before actually stopping the terminating processing for B. Moreover, the P-A-ID modification can also be applied to the embodiment shown in FIG. 4.

Moreover, it is to be noted that the above examples can be combined in different manners. For example:

With respect to R-URI change:
a. B AS just changes the R-URI, and there is no special indication in the processing result.
b. B AS indicates the change of R-URI in the processing result.

For changing P-A-ID there are two places for options:

The place of change:
0. No change (this is a possible option too, although this way C will not know that B is involved).
1. Done in B AS.
2. Done (at some point) in B S-CSCF after the redirection has been detected.

The way of change:
X. Replace A with B.
Y. Replace A with B,A.

Then, possible combinations are 0, 1X, 1Y, 2X, and 2Y.

Taking into account also the R-URI change, possible combinations are a0, b0, a1X, b1X, a1Y, b1Y, a2X, b2X, a2Y, and b2Y.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method, comprising:
receiving a service request according to a session initiation protocol, initiated by a first user and terminated at a second user, in a device serving the second user;
forwarding the received service request from the device to an application server to process the service request;
receiving, in the device, a processing result of the processed service request from the application server;
first determining in the device, based on the received processing result, whether a service request processing of the service request in the device is to be and stopped; and
wherein the service request and the processing result each include destination identifiers,
the first determining further comprising
comparing the destination identifiers of the service request forwarded to the application server and the processing result received from the application server, and
stopping the service request processing for the second user when the compared destinations identifiers are different.

2. The method according to claim 1, wherein the first determining further comprises:
checking whether the processing result received from the application server includes an indication to stop the service request processing for the second user, and
when the indication is present, stopping the service request processing for the second user.

3. The method according to claim 2, further comprising:
when the indication is present, checking whether the indication is valid.

4. The method according to claim 1, further comprising:
before stopping the service request processing for the second user, performing a charging processing.

5. The method according to claim 1, further comprising:
second determining, based on the received processing result, whether to forward the service request to a third user.

6. The method according to claim 5,
the second determining further comprising:
comparing the destination identifiers of the service request forwarded to the application server and the processing result received from the application server; and
switching to originating mode and forwarding the service request based on the destination identifier included in the processing result when a determination is made that the compared destination identifiers are different.

7. The method according to claim 5, further comprising:
detecting whether an originating identifier included in the processing result is an originating identifier of the second user; and
when the originating identifier included in the processing result is the originating identifier of the second user, forwarding the service request based on an originating identifier included in the processing result.

8. The method according to claim 7, further comprising, when the originating identifier included in the processing result is not the originating identifier of the second user, including the originating identifier of the second user in the service request to be forwarded based on the processing result.

9. The method according to claim 7, further comprising replacing an originating identifier of the first user with the originating identifier of the second user.

10. The method according to claim 7, further comprising adding the originating identifier of the second user to an originating identifier of the first user.

11. A method, comprising:
receiving a service request according to a session initiation protocol, initiated by a first user and terminated at a second user, in an application server from a device serving the second user;
processing the service request in the application server; and
returning a processing result of the processed service request to the device, based on the processing result the device being configured to determine whether a service request processing of the service request in the device is to be stopped,
wherein the service request and the processing result each include destination identifiers,
wherein the device is further configured to compare the destination identifiers of the service request and the processing result, and
wherein the device is further configured to stop the service request processing for the second user when the compared destinations identifiers are different.

12. The method according to claim 11, further comprising:
including in the processing result an indication to stop the service request processing for the second user.

13. The method according to claim 11,
processing the service further comprising determining the service request is to be forwarded to a third user;

replacing at destination identifier of the second user included in the received service request by a destination identifier of the third user; and returning the processing result with the destination identifier of the third user.

14. The method according to claim 13, further comprising:
including an originating identifier of the second user in the processing result when determining that the service request is to be redirected to a third user.

15. The method according to claim 14, further comprising replacing an originating identifier of the first user with the originating identifier of the second user.

16. The method according to claim 14, further comprising adding the originating identifier of the second user to an originating identifier of the first user.

17. An apparatus, comprising:
means for receiving a service request according to a session initiation protocol initiated by a first user, and terminated at a second user, the apparatus serving the second user;
means for forwarding the received service request to an application server for processing the service request;
means for receiving a processing result of the processed service request from the application server; and
means for determining, based on the received processing result, whether a service request processing of the service request in the apparatus is to be stopped; and
wherein the service request and the processing result each include destination identifiers,
wherein the means for determining further comprises
means for comparing the destination identifiers of the service request forwarded to the application server and the processing result received from the application server, and
means for stopping the service request processing for the second user when the compared destinations identifiers are different.

18. An apparatus, comprising:
means for receiving a service request according to a session initiation protocol, initiated by a first user and terminated at a second user, from a device serving the second user;
means for processing the service request; and
means for returning a processing result of the processed service request to the device, based on the processing result the device being configured to determine whether a service request processing of the service request in the device is to be stopped,
wherein the service request and the processing result each include destination identifiers,
wherein the device is further configured to compare the destination identifiers of the service request and the processing result, and
wherein the device is further configured to stop the service request processing for the second user when the compared destination identifiers are different.

19. A computer program product for use in an IP multimedia core network, the computer program product comprising a computer usable medium having computer readable program code embodied in said medium, said computer readable program code comprising:
a first computer readable program code configured to cause a computer to receive a service request according to a session initiation protocol, initiated by a first user and terminated at a second user in a device serving the second user;
a second computer readable program code configured to cause the computer to forward the received service request from the device to an application server to process the service request;
a third computer readable program code configured to cause the computer to receive a processing result of the processed service request from the application server in the device;
a fourth computer readable program code configured to cause the computer to determine in the device, based on the received processing result, whether a service request processing of the service request in the device is to be stopped; and
wherein the service request and the processing result each include destination identifiers,
wherein the fourth computer readable program code is further configured to cause the computer to compare the destination identifiers of the service request forwarded to the application server and the processing result received from the application server, and
wherein the fourth computer readable program code is further configured to stop the service request processing for the second user when the compared destination identifiers are different.

20. A computer program product for use in an IP multimedia core network, the computer program product comprising a computer usable medium having computer readable program code embodied in said medium, said computer readable program code comprising:
a first computer readable program code configured to cause a computer to receive a service request according to a session initiation protocol initiated by a first user and terminated at a second user, from a device serving the second user;
a second computer readable program code configured to cause the computer to process the service request; and
a third computer readable program code configured to cause the computer to return a processing result of the processed service request to the device, based on the processing result the device being configured to determine whether a service request processing of the service request in the device is to be stopped,
wherein the service request and processing result each include destination identifiers,
wherein the device is further configured to compare the destination of the service request and the processing result, and
wherein the device is further configured to stop the service request processing for the second user when the compared destinations identifiers are different.

21. An apparatus, comprising:
a first receiver configured to receive a service request according to a session initiation protocol, initiated by a first user and terminated at a second user, the apparatus serving the second user;
a forwarder configured to forward the received service request to an application server configured to process the service request;
a second receiver configured to receive a processing result of the processed service request from the application server;
a determiner configured to determine, based on the received processing result, whether a service request processing of the service request in the apparatus is to be stopped; and
wherein the service request and the processing result each include the destination identifiers, wherein the determiner is further configured to compare the destination identifiers of the service request forwarded to the application server and the processing result received from the application server, and wherein the determiner is further configured to stop the service request processing for the second user when the compared destinations identifiers are different.

22. An apparatus, comprising:

a receiver configured to receive a service request according to a session initiation protocol, initiated by a first user and terminated at a second user, from a device serving the second user;

a processor configured to process the service request; and a returner configured to return a processing result of the processed service request to the device, based on the processing result the device being configured to determine whether a service request processing of the service request in the apparatus is to be stopped, wherein the service request and the processing result each include destination identifiers, wherein the device is further configured to compare the destination identifiers of the service request and the processing result, and wherein the device is further configured to stop the service request processing for the second user when the compared destinations identifiers are different.

23. The apparatus according to claim 21, wherein the determiner is further configured to check whether the processing result received from the application server includes an indication to stop the service request processing for the second user, and when the indication is present, stop the service request processing for the second user.

24. The apparatus according to claim 23, wherein the determiner is further configured to check, when the indication is present, whether the indication is valid.

25. The apparatus according to claim 21, wherein the determiner is configured to perform a charging processing before stopping the service request processing for the second user.

26. The apparatus according to claim 21, wherein the determiner further comprises:

a comparator configured to compare the destination identifiers of the service request forwarded to the application server and the processing result received from the application server, and wherein the service request processing for the second user is stopped when the compared destinations identifiers are different.

27. The apparatus according to claim 21, wherein the determiner is configured to determine whether to forward the service request to a third user based on the received processing result.

28. The apparatus according to claim 27, wherein the determiner further comprises:

a comparator configured to compare the destination identifiers of the service request forwarded to the application server and the processing result received from the application server; and a switch configured to switch to originating mode and to forward the service request based on the destination identifier included in the processing result when a determination is made that the compared destination identifiers are different.

29. The apparatus according to claim 27, wherein the determiner is configured to detect whether an originating identifier included in the processing result is an originating identifier of the second user; and the apparatus further comprises:

a transmitter configured to forward the service request based on the originating identifier included in the processing result when the originating identifier included in the processing result is the originating identifier of the second user.

30. The apparatus according to claim 29, wherein the determiner is configured to include the originating identifier of the second user in the service request to be forwarded based on the processing result when the originating identifier included in the processing result is not the originating identifier of the second user.

31. The apparatus according to claim 29, wherein the determiner is further configured to replace an originating identifier of the first user with the originating identifier of the second user.

32. The apparatus according to claim 29, wherein the determiner is configured to add the originating identifier of the second user to an originating identifier if the first user.

33. The apparatus according to claim 22, wherein the returner is configured to include in the processing result an indication to stop the service request processing for the second user.

34. The apparatus according to claim 22, wherein the processor is configured to:

determine that the service request is to be forwarded to a third user;

replace the destination identifier of the second user included in the received service request by a destination identifier of the third user; and return the processing result with the destination identifier of the third user.

35. The apparatus according to claim 34, wherein the processor is configured to include an originating identifier of the second user in the processing result when determining that the service request is to be redirected to the third user.

36. The apparatus according to claim 35, wherein the processor is configured to replace an originating identifier of the first user with the originating identifier of the second user.

37. The apparatus according to claim 35, wherein the processor is configured to add the originating identifier of the second user to an originating identifier of the first user.

* * * * *